United States Patent
Nabeshima et al.

(10) Patent No.: US 9,005,038 B2
(45) Date of Patent: Apr. 14, 2015

(54) ROTATION TRANSMITTING APPARATUS, VEHICLE STEERING SYSTEM, AND INTERMEDIATE SHAFT

(71) Applicant: JTEKT Corporation, Osaka-shi, Osaka (JP)

(72) Inventors: Koichi Nabeshima, Kashiwara (JP); Eiji Kaneuchi, Kitakatsuragi-gun (JP); Yoshimasa Yamada, Kitakatsuragi-gun (JP); Ryousuke Imai, Kashiwara-shi (JP)

(73) Assignee: JTEKT Corporation, Osaka-shi (JP)

( * ) Notice: Subject to any disclaimer, the term of this patent is extended or adjusted under 35 U.S.C. 154(b) by 0 days.

(21) Appl. No.: 14/025,136

(22) Filed: Sep. 12, 2013

(65) Prior Publication Data

US 2014/0080614 A1    Mar. 20, 2014

(30) Foreign Application Priority Data

Sep. 19, 2012 (JP) ................. 2012-205716
Mar. 25, 2013 (JP) ................. 2013-062252

(51) Int. Cl.
  *F16C 3/035* (2006.01)
  *F16D 1/108* (2006.01)
  *F16D 3/06* (2006.01)
  *B62D 1/185* (2006.01)
  *F16D 1/10* (2006.01)

(52) U.S. Cl.
  CPC ... *F16D 1/108* (2013.01); *F16D 3/06* (2013.01); *F16D 2001/103* (2013.01); *B62D 1/185* (2013.01); *F16C 3/035* (2013.01)

(58) Field of Classification Search
  CPC ......... B21D 1/185; F16C 3/035; F16C 1/108; F16C 3/06; F16C 2001/103
  USPC .............. 464/74–76, 162; 74/492; 403/359.1–359.6
  See application file for complete search history.

(56) References Cited

U.S. PATENT DOCUMENTS

| 2,166,931 | A | * | 7/1939 | William | ............... 464/76 X |
| 5,460,574 | A | | 10/1995 | Hobaugh | |
| 6,283,867 | B1 | | 9/2001 | Aota et al. | |

FOREIGN PATENT DOCUMENTS

| DE | 1 267 480 | * | 5/1968 | ............ 464/74 |
| EP | 2 281 731 A2 | | 2/2011 | |
| JP | 5-157119 A | * | 6/1993 | ............ 464/74 |
| JP | A-2009-168144 | | 7/2009 | |
| WO | WO 2012/066904 A1 | | 5/2012 | |

OTHER PUBLICATIONS

Feb. 20, 2014 Extended European Search Report issued in European Application No. 13184681.8.

* cited by examiner

*Primary Examiner* — Gregory Binda
(74) *Attorney, Agent, or Firm* — Oliff PLC

(57) ABSTRACT

A rotation transmitting apparatus includes a first shaft on which multiple external teeth are formed so as to be arranged in a circumferential direction, and a second shaft in which multiple internal teeth are formed so as to be arranged in the circumferential direction, the second shaft being fitted to the first shaft so as to be slidable relative to the first shaft in the axial direction and so as to be engageable with the first shaft in a rotational direction through the use of the external teeth and the internal teeth. A protrusion is formed on the tooth flank of one of the external tooth and the internal tooth, the protrusion being projected toward the corresponding tooth flank of the other of the external tooth and the internal tooth. The protrusion is made of a resin that is more elastically deformable than the tooth flank.

5 Claims, 10 Drawing Sheets

ROTATION TRANSMITTING APPARATUS, VEHICLE STEERING SYSTEM, AND INTERMEDIATE SHAFT

INCORPORATION BY REFERENCE

This application claims priority to Japanese Patent Application No. 2012-205716 filed on Sep. 19, 2012 and Japanese Patent Application No. 2013-062252 filed on Mar. 25, 2013 the disclosure of which, including the specification, drawings and abstract, is incorporated herein by reference in its entirety.

BACKGROUND OF THE INVENTION

1. Field of the Invention

The invention relates to a rotation transmitting apparatus having two rotary shafts that are fitted together so as to be slidable relative to each other in the axial direction and so as to be engageable with each other in the rotational direction, a vehicle steering system, and an intermediate shaft.

2. Description of Related Art

Japanese Patent Application Publication No. 2009-168144 (JP 2009-168144 A) describes a rotation transmitting apparatus in which a spline shaft is fitted to a spline sleeve so as to be slidable relative to the spline sleeve in the axial direction and so as to be engageable with the spline sleeve in the rotational direction. JP 2009-168144 A describes a driving force transmission apparatus having protrusions 6PR formed at radially outer ends of ridges so as to extend in the axial direction, and protrusions 6RB formed at axially opposite ends of the ridges so as to extend continuously in the circumferential direction.

The protrusions 6PR and the protrusions 6RB have the effect of decreasing a radial backlash between the spline sleeve and the spline shaft, thereby allowing the spline shaft to smoothly slide relative to the spline sleeve.

The protrusions 6PR have the function of decreasing the radial backlash, but do not have the function of absorbing a backlash in the rotational direction. Therefore, it is not possible to smoothly transmit the rotation of the spline sleeve to the spline shaft. Further, the protrusions 6RB do not have the function of absorbing the backlash in the rotational direction. Therefore, it is not possible to smoothly transmit the rotation of the spline shaft to the spline sleeve.

SUMMARY OF THE INVENTION

The invention provides a rotation transmitting apparatus configured such that rotation is smoothly transmitted between a first rotary shaft and a second rotary shaft, a vehicle steering system including the rotation transmitting apparatus, and an intermediate shaft provided with the rotation transmitting apparatus.

According to a feature of an example of the invention, there is provided a rotation transmitting apparatus including a first rotary shaft on which multiple external teeth projected radially outward and extending in an axial direction are formed so as to be arranged in a circumferential direction, and a second rotary shaft in which multiple internal teeth projected radially inward and extending in the axial direction are formed so as to be arranged in the circumferential direction, the second rotary shaft being fitted to the first rotary shaft so as to be slidable relative to the first rotary shaft in the axial direction and so as to be engageable with the first rotary shaft in a rotational direction through the use of the external teeth and the internal teeth, in which: the external teeth and the internal teeth have tooth flanks that are engaged with each other in the rotational direction; a protrusion is formed on the tooth flank of one of the external tooth and the internal tooth, the protrusion being projected toward the corresponding tooth flank of the other of the external tooth and the internal tooth and extending in the axial direction; and the protrusion is made of a resin that is more elastically deformable than the tooth flank.

BRIEF DESCRIPTION OF THE DRAWINGS

The foregoing and further objects, features and advantages of the invention will become apparent from the following description of example embodiments with reference to the accompanying drawings, wherein like numerals are used to represent like element and wherein.

DETAILED DESCRIPTION OF EMBODIMENTS

Hereinafter, embodiments of the invention will be described with reference to the accompanying drawings.

Figure 1:
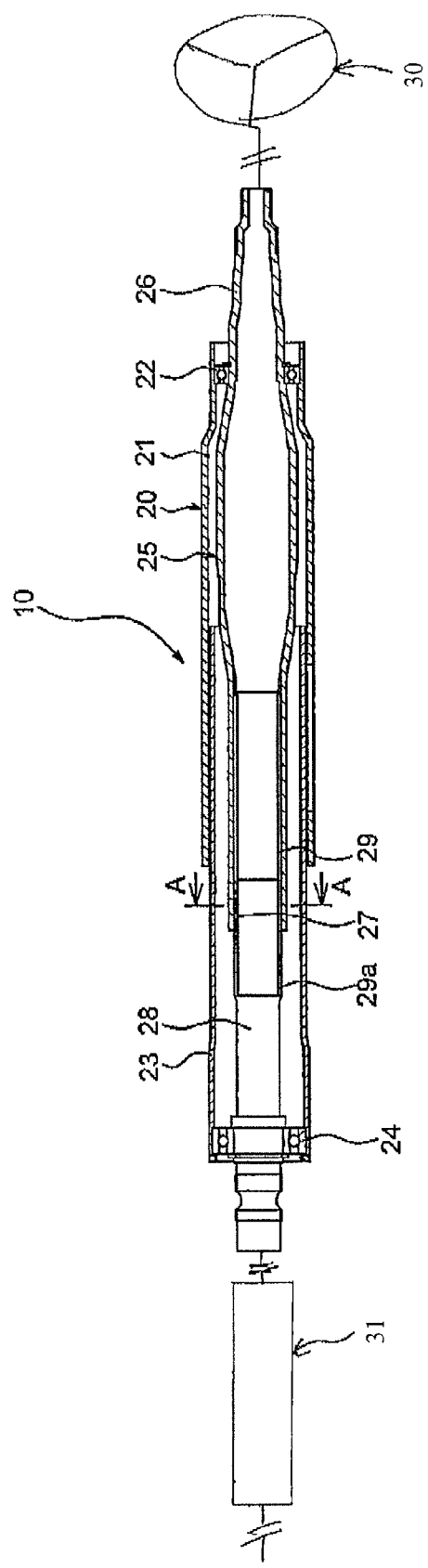
FIG. 1 is a longitudinal sectional view illustrating a vehicle steering system according to a first embodiment of the invention.
Figure 2:
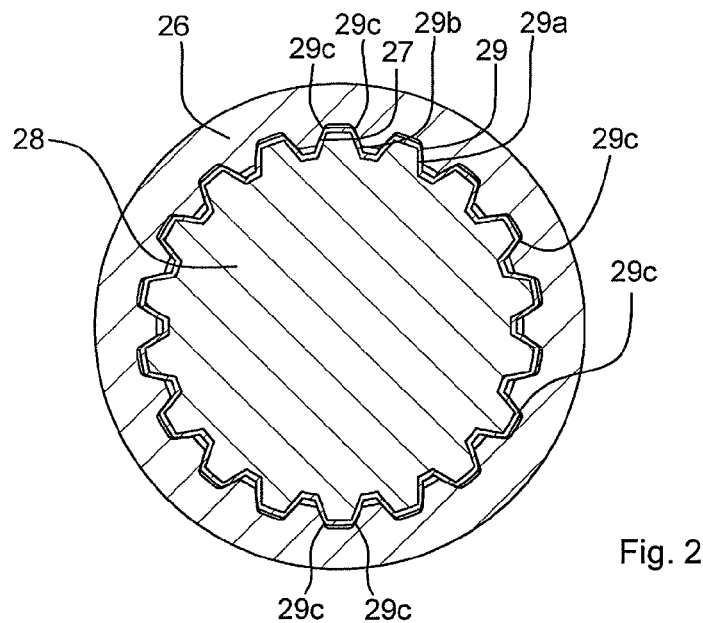
FIG. 2 is a sectional view taken along the line A-A in FIG. 1.
Figure 3:
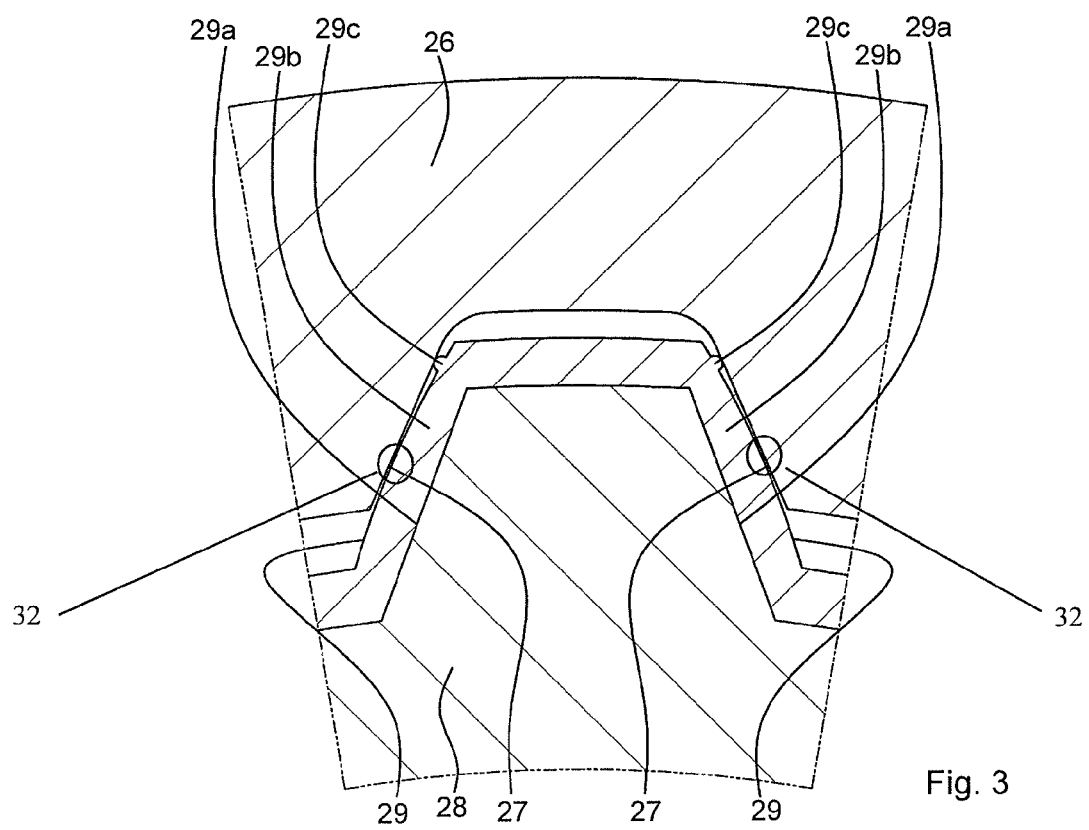
FIG. 3 is a partially enlarged sectional view of FIG. 2.
Figure 4:
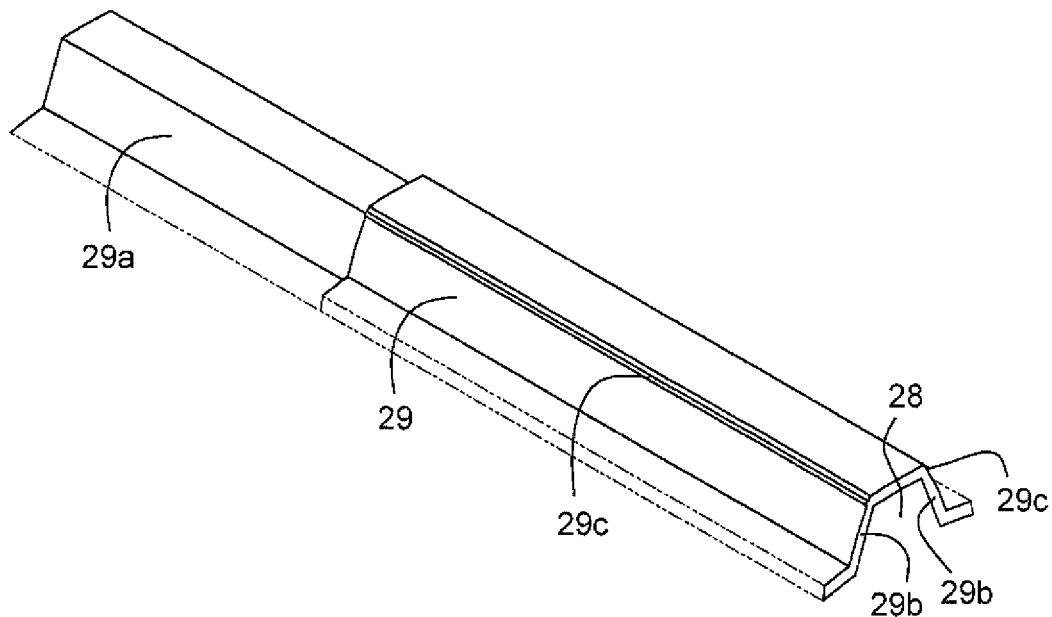
FIG. 4 is an enlarged perspective view illustrating part of an inner shaft in the first embodiment.
Figure 5:
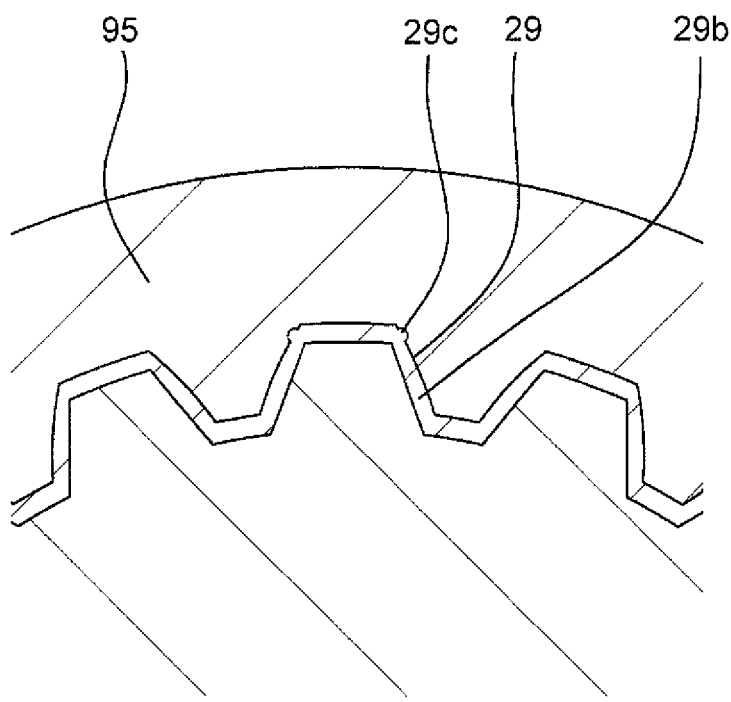
FIG. 5 is a sectional view for describing a shaping process performed with the use of dies in the first embodiment.

A vehicle steering system 10 according to a first embodiment of the invention will be described with reference to FIG. 1 to FIG. 5. FIG. 1 is a longitudinal sectional view of the vehicle steering system 10. FIG. 2 is a sectional view taken along the line A-A in FIG. 1. FIG. 3 is a partially enlarged sectional view of FIG. 2. FIG. 4 is an enlarged perspective view illustrating part of an inner shaft. FIG. 5 is a sectional view for describing a shaping process performed with the use of dies.

As shown in FIG. 1 and FIG. 2, the vehicle steering system 10 includes a steering tube 20 and a steering shaft 25 that are rotatably supported by the steering tube 20 via bearings 22, 24. The vehicle steering system 10 is secured to a vehicle body via a bracket (not shown). A steering wheel 30 is rotatably coupled to one end of the steering shaft 25, and an intermediate shaft 31 is rotatably coupled to the other end of the steering shaft 25.

The steering tube 20 is formed of a cylindrical outer tube 21 and a cylindrical inner tube 23. The inner tube 23 is fitted to the outer tube 21 with a clearance. The bracket (not shown) is secured to the outer tube 21, and an outer shaft 26, which will be described later, is rotatably supported by the outer tube 21 via the bearing 22. An inner shaft 28, which will be described later, is rotatably supported by the inner tube 23 via the bearing 24.

The steering shaft 25 is formed of the cylindrical outer shaft 26 and the columnar inner shaft 28. The inner shaft 28 is fitted to the outer shaft 26 so as to be slidable relative to the outer shaft 26 in the axial direction and so as to be engageable with the outer shaft 26 in the rotational direction. The steering wheel 30 is coupled to one end of the outer shaft 26, and the intermediate shaft 31 is coupled to an end of the inner shaft 28, which is on the opposite side of the inner shaft 28 from the outer shaft 26. Further, the intermediate shaft is coupled to wheels via a pinion shaft and a rack shaft, which are not shown.

As shown in FIG. 3 to FIG. 5, splines are formed on the inner periphery of the outer shaft 26 and the outer periphery of the inner shaft 28. The splines of the outer shaft 26 have internal teeth 27 projected radially inward and each having a trapezoidal sectional shape, and the splines of the inner shaft 28 have external teeth 29 projected radially outward and each having a trapezoidal sectional shape. The internal teeth 27 are formed on the inner periphery of the outer shaft 26 at equal intervals in the circumferential direction, and extend in the axial direction. The external teeth 29 are formed on the outer periphery of the inner shaft 28 at equal intervals in the circumferential direction, and extend in the axial direction.

The internal teeth 27 and the external teeth 29 have tooth flanks that are engaged with each other in the rotational direction. The section of the tooth flank of each of the internal teeth 27 has a straight line, and the section of the tooth flank of each of the external teeth 29 has an involute curve. As shown in FIG. 2 to FIG. 5, the external teeth 29 are manufactured by forming base external teeth 29a each having a trapezoidal sectional shape through, for example, form rolling of ferrous material, then forming a resin coating 29b having a predetermined thickness on the base external teeth 29a, and finally shaping the outer periphery of the resin coating 29b with the use of, for example, dies (FIG. 5).

A protrusion 29c having a semicircular sectional shape is formed on each of the right and left tooth flanks of the external tooth 29. The protrusion 29c is projected to such a position as to contact the corresponding tooth flank of the internal tooth 27, and extends in parallel with the axis of the inner shaft 28. A portion of each spline of the inner shaft 28, the portion extending from one end of the spline to an intermediate portion thereof, is formed of the external tooth 29 having the resin coating 29b, and the remaining portion of the spline, the remaining portion extending from the intermediate portion to the other end of the spline, is formed of a portion of the base external tooth 29a having no resin coating 29b. It is not necessary to form the protrusions 29c on all the external teeth 29. In the embodiment described above, no protrusions 29c are formed on the external teeth 29 that are adjacent to the external tooth 29 on which the protrusions 29c are formed. The area of contact between the protrusions 29c and the tooth flanks of the internal teeth 27 is smaller than the area of contact 32 between the tooth flanks of the internal teeth 27 and the tooth flanks of the external teeth 29. Therefore, the protrusions 29c are easily deformed elastically.

On the basis of the configuration described above, a method of forming the splines of the inner shaft 28 will be described below. The base external teeth 29a each having a trapezoidal sectional shape are formed on the outer periphery of the inner shaft 28 at equal intervals in the circumferential direction. A portion of each base external tooth 29a, which extends from one end of the base external tooth 29a to an intermediate portion thereof, is drenched into a tank filled with resin. Thus, the resin coating 29b is formed on the portion of each base external tooth 29a, which extends from the one end of the base external tooth 29a to the intermediate portion thereof. After the resin coating 29b is cured, the resin coating 29b is subjected to the shaping process performed with the use of dies 95. The dies 95 include a rough cutting die and a finishing die. The resin coating 29b is roughly cut by the rough cutting die, and then the resin coating 29b is cut by the finishing die so as to be finished. With the use of the dies 95, the tooth flanks and the protrusions 29c are simultaneously formed. Thus, the portion of each spline of the inner shaft 28, which extends from one end of the spline to the intermediate portion thereof, is formed of the external tooth 29, and the remaining portion of the spline is formed of the base external teeth 29a. The resin coating 29b is made of a hot-melt resin. In another example, a two-component curable resin may be used.

Next, the steps of assembling the steering tube will be described. The inner shaft 28 is spline-fitted to the outer shaft 26. Because the protrusions 29c are softer than the tooth flanks, the inner shaft 28 is smoothly fitted to the outer shaft 26 and slid in the axial direction with no radial backlash. The bearing 22 is fitted to the outer tube 21, and the bearing 22 is secured to the outer tube 21 by clinching part of the outer tube 21. The bearing 24 is fitted to the inner tube 23, and the bearing 24 is secured to the inner tube 23 by clinching part of the inner tube 23. The bearing 22 is fitted to the steering shaft 25 and a snap ring is fitted to the steering shaft 25 to prevent the bearing 22 from being removed from the steering shaft 25. The bearing 24 is fitted to the steering shaft 25 and a snap ring is fitted to the steering shaft 25 to prevent the bearing 24 from being removed from the steering shaft 25. Thus, the steering shaft 25 is rotatably assembled to the steering tube 20.

Next, the axial movement of the outer tube 21 and the outer shaft 26 will be described. The outer tube 21 is moved in the longitudinal direction relative to the inner tube 23, and, at the same time, the outer shaft 26 is moved in the longitudinal direction relative to the inner shaft 28.

Because the protrusions 29c of the external teeth 29 of the inner shaft 28 come into soft contact with the tooth flanks of the internal teeth 27 of the outer shaft 26, the outer shaft 26 is smoothly slid relative to the inner shaft 28. Because the protrusions 29c extend over a predetermined length so as to be in parallel with the axis of the inner shaft 28, it is possible to restrain the outer shaft 26 from being tilted with respect to the inner shaft 28, and accordingly, the inner shaft 28 and the outer shaft 26 are easily assembled together.

The operation for rotating the steering wheel will be described. When the steering wheel is rotated, the rotation of the steering wheel is transmitted to the intermediate shaft via the outer shaft 26 and the inner shaft 28. Because the protrusions 29c of the external teeth 29 of the inner shaft 28 come into contact with the tooth flanks of the internal teeth 27 of the outer shaft 26, the protrusions 29c extend over the predetermined length so as to be in parallel with the axis of the inner shaft 28, and the protrusions 29c have an elastic force large enough to transmit torque, the rotation of the outer shaft 26 is smoothly transmitted to the inner shaft 28.

Figure 6:
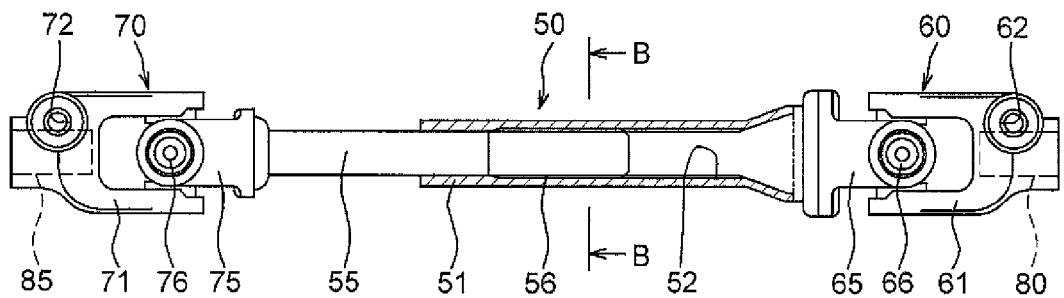
FIG. 6 is a front view illustrating an intermediate shaft in a second embodiment of the invention.
Figure 7:
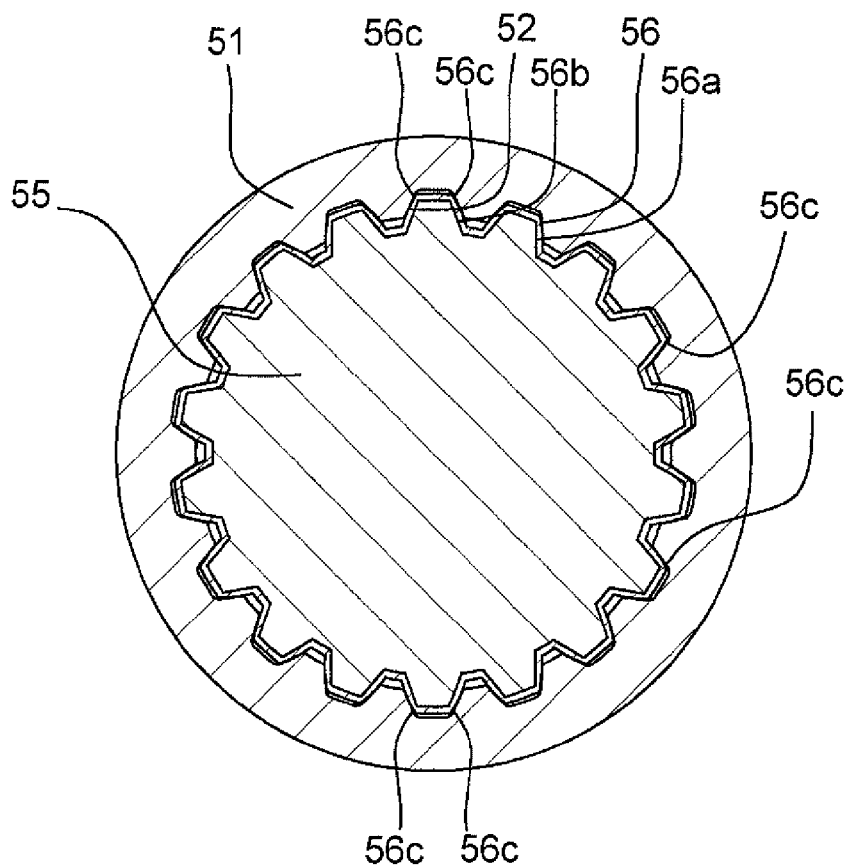
FIG. 7 is a sectional view taken along the line B-B in FIG. 6.
Figure 8:
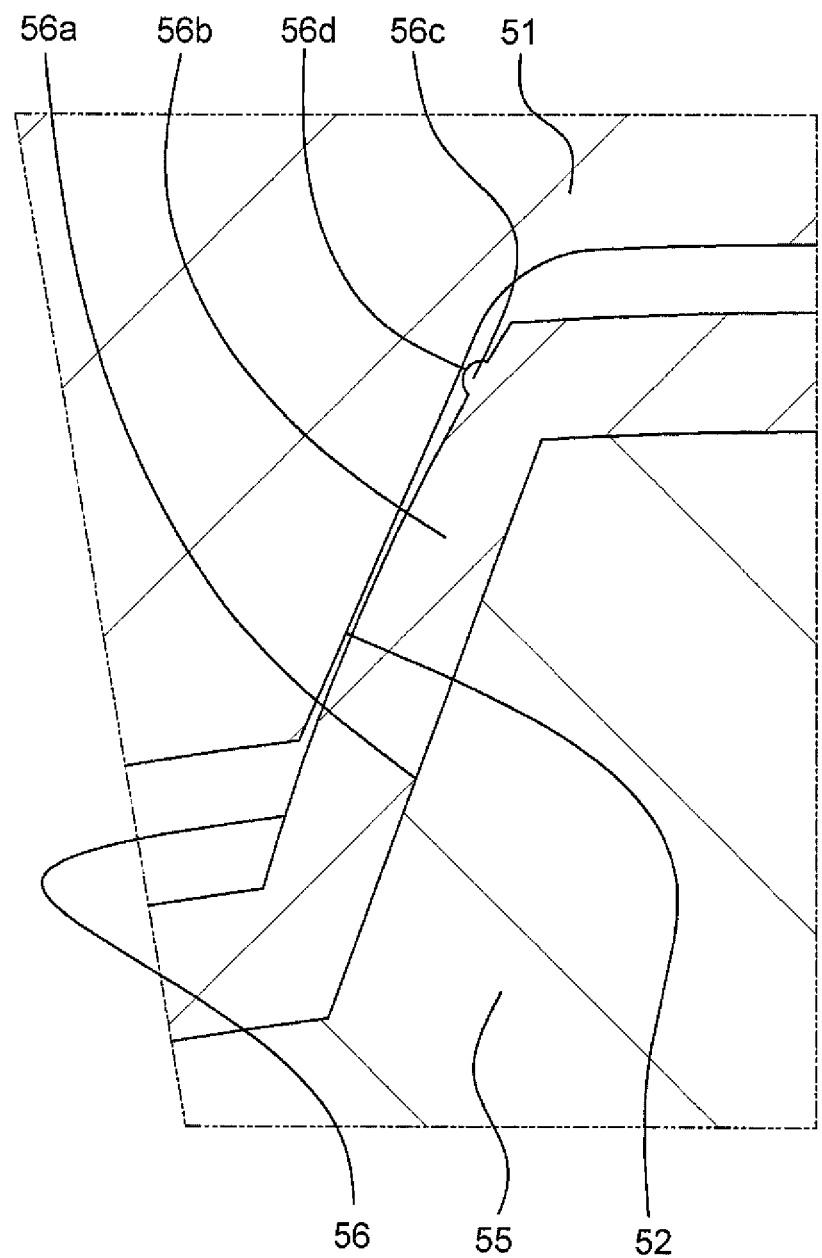
FIG. 8 is a partially enlarged view of FIG. 7.

Next, an intermediate shaft according to a second embodiment of the invention will be described with reference to FIG. 6 to FIG. 8. FIG. 6 is a front view illustrating the intermediate shaft. FIG. 7 is a sectional view taken along the line B-B in FIG. 6. FIG. 8 is a partially enlarged sectional view of FIG. 7.

As shown in FIG. 6 and FIG. 7, the intermediate shaft 50 is formed of an upper shaft 51, a lower shaft 55 that is telescopically and rotatably coupled to the upper shaft 51, a first universal joint 60 provided at an end of the upper shaft 51, which is on the opposite side of the upper shaft 51 from the lower shaft 55.

The first universal joint 60 is formed of a first yoke 61, a first cruciform member (not shown), and a second yoke 65. The first yoke 61 and the first cruciform member are coupled to each other so as to be rotatable relative to each other, and the first cruciform member and the second yoke 65 are coupled to each other so as to be rotatable relative to each other. The axis of rotation of the first yoke 61 with respect to the first cruciform member is orthogonal to the axis of rotation of the second yoke 65 with respect to the first cruciform member. A steering shaft 80 of a vehicle steering system is coupled to the first yoke 61, and the upper shaft 51 is formed integrally with the second yoke 65. A threaded hole 62 is formed in the first yoke 61. The threaded hole 62 is used to fixedly fasten the steering shaft 80 to the first yoke 61.

The second universal joint 70 is formed of a third yoke 71, a second cruciform member (not shown), and a fourth yoke 75. The third yoke 71 and the second cruciform member are coupled to each other so as to be rotatable relative to each other, and the second cruciform member and the fourth yoke 75 are coupled to each other so as to be rotatable relative to each other. The axis of rotation of the third yoke 71 with respect to the second cruciform member is orthogonal to the axis of rotation of the fourth yoke 75 with respect to the second cruciform member. A pinion shaft 85 is coupled to the third yoke 71, and the lower shaft 55 is formed integrally with the fourth yoke 75. A threaded hole 72 is formed in the third yoke 71. The threaded hole 72 is used fixedly fasten the pinion shaft 85 to the third yoke 71.

As shown in FIG. 7 and FIG. 8, splines are formed on the inner periphery of the upper shaft 51 and on the outer periphery of the lower shaft 55. The splines of the upper shaft 51 have internal teeth 52 projected radially inward and each having a trapezoidal sectional shape. The splines of the lower shaft 55 have external teeth 56 projected radially outward and each having a trapezoidal sectional shape. The internal teeth 52 are formed on the inner periphery of the upper shaft 51 at equal intervals in the circumferential direction, and extend in the axial direction. The external teeth 56 are formed on the outer periphery of the lower shaft 55 at equal intervals in the circumferential direction, and extend in the axial direction.

The internal teeth 52 and the external teeth 56 have tooth flanks that are engaged with each other. The section of the tooth flank of each of the internal teeth 52 has an involute curve, and the section of the tooth flank of each of the external teeth 56 has an involute curve. The external teeth 56 are manufactured by forming base external teeth 56a each having a trapezoidal sectional shape from ferrous material, then forming a resin coating 56b having a predetermined thickness on the base external teeth 56a, and finally shaping the outer periphery of the resin coating 56b with the use of, for example, dies. A protrusion 56c having a semicircular sectional shape is formed on each of the right and left tooth flanks of each external tooth 56. The protrusion 56c is projected to such a position that a clearance 56d is formed between the protrusion 56c and the tooth flank of the internal tooth 52, and extends in parallel with the axis of the lower shaft 55. It is not necessary to form the protrusions 56c on all the external teeth 56. In the embodiment described above, no protrusions 56c are formed on the external teeth 56 that are adjacent to the external tooth 56 on which the protrusions 56c are formed.

The movement of the lower shaft 55 relative to the upper shaft 51 in the axial direction will be described. Because the protrusions 56c of the external teeth 56 of the lower shaft 55 come into soft contact with the tooth flanks of the internal teeth 52 of the upper shaft 51, the upper shaft 51 is smoothly slid relative to the lower shaft 55. Because the protrusions 56c extend over a predetermined length so as to be in parallel with the axis of the lower shaft 55, it is possible to restrain the upper shaft 51 from being tilted with respect to the lower shaft 55, and accordingly, the lower shaft 55 and the upper shaft 51 are easily assembled together.

Next, a rotation transmitting apparatus will be described. The rotation of the steering shaft 80 is transmitted to the pinion shaft 85 via the first universal joint 60, the upper shaft 51, the lower shaft 55, and the second universal joint 70. Because the protrusions 56c of the external teeth 56 of the lower shaft 55 come into contact with the tooth flanks of the internal teeth 52 of the upper shaft 51, the protrusions 56c extend over a predetermined length so as to be in parallel with the axis of the lower shaft 55, and the protrusions 56c have an elastic force large enough to transmit torque, the rotation of the upper shaft 51 is smoothly transmitted to the lower shaft 55. Even if there are variations such as pitch variations and tooth profile variations among a plurality of the external teeth 56, the clearance 56d is made as small as possible because the protrusions 56c have elasticity that is lower than the elasticity of the tooth flanks of the external teeth 56. Therefore, the rotation of the upper shaft 51 is immediately transmitted to the lower shaft 55.

Next, a fourth embodiment of the invention will be described with reference to FIG. 10 to FIG. 13. In the fourth embodiment, the positions and the configuration of protrusions are made different from those in the vehicle steering system in the first embodiment so that the amount of elastic deformation of the protrusions is controlled. Because the components and the parts other than the protrusions are substantially the same as those in the first embodiment, like reference numerals are used to denote these components and the parts, and descriptions thereof are omitted.

Figure 10:
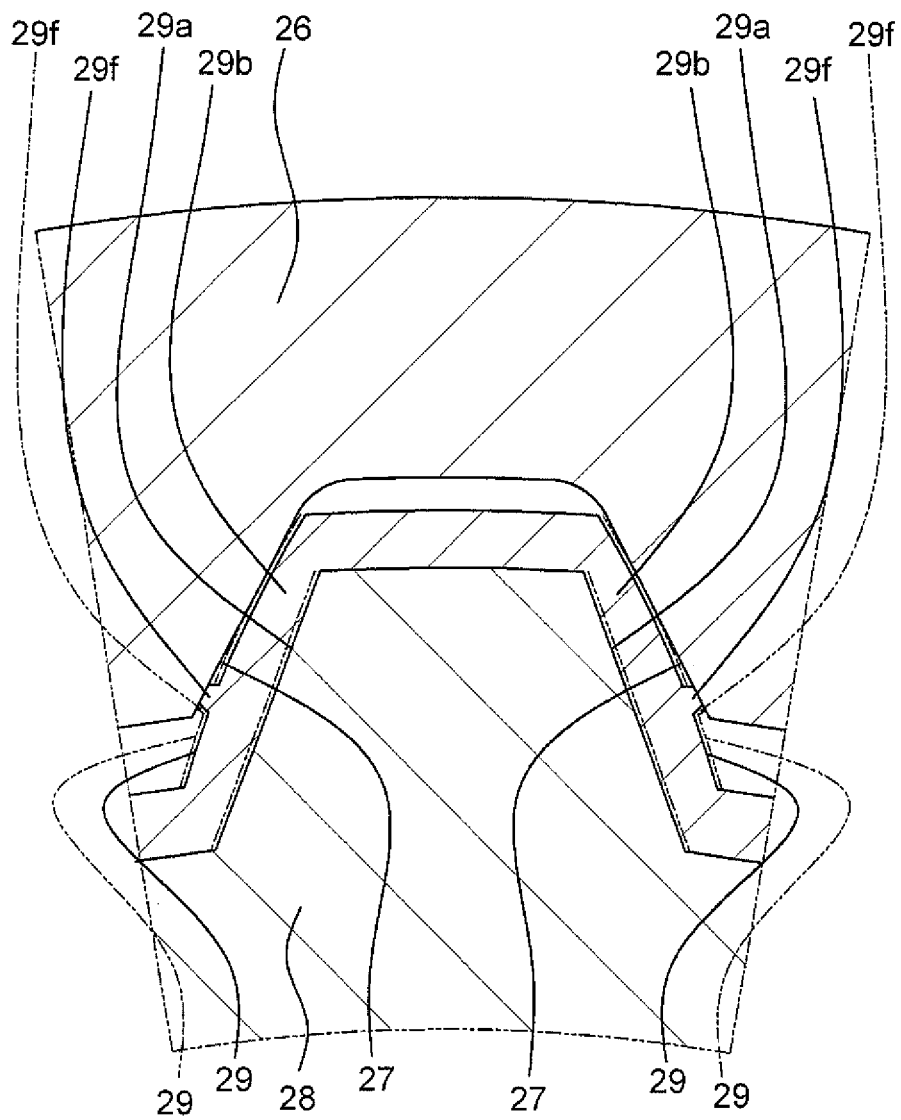
FIG. 10 is a partially enlarged sectional view illustrating, as a state diagram, an amount of relative rotation between an outer shaft and an inner shaft in a fourth embodiment of the invention.
Figure 11:
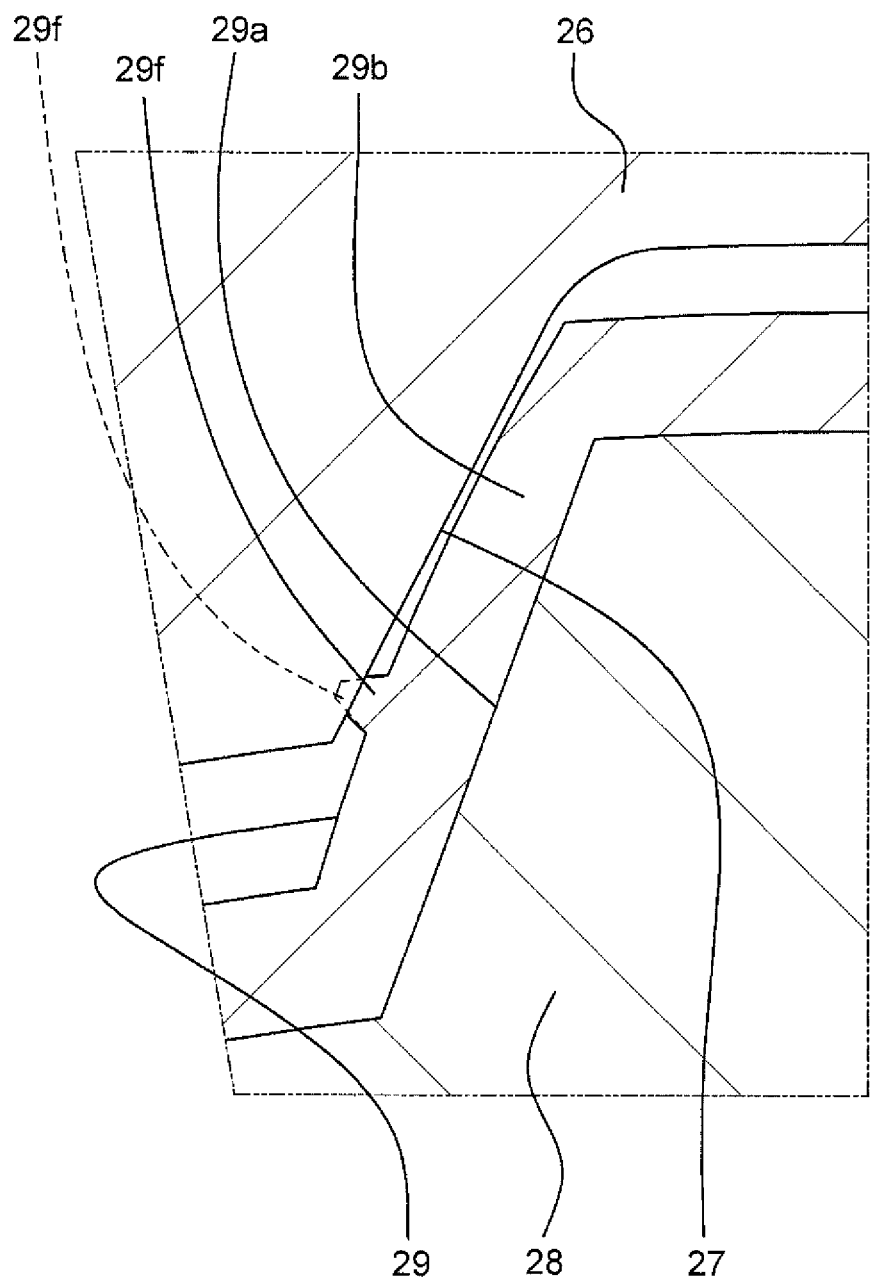
FIG. 11 is a partially enlarged view of FIG. 10 illustrating, as a state diagram, an amount of elastic deformation of a protrusion before the relative rotation.
Figure 12:
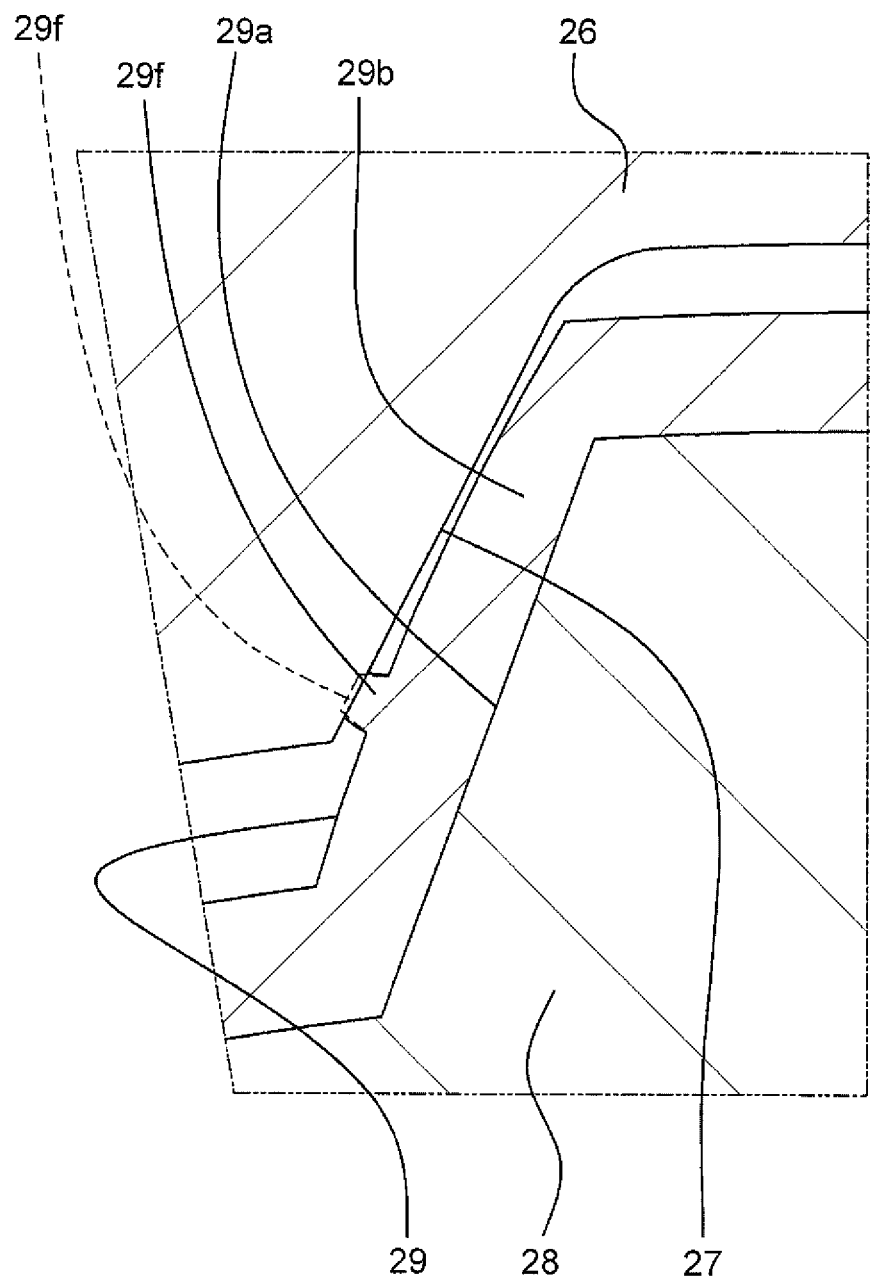
FIG. 12 is a partially enlarged view of FIG. 10 illustrating, as a state diagram, an amount of elastic deformation of the protrusion after the relative rotation.
Figure 13:
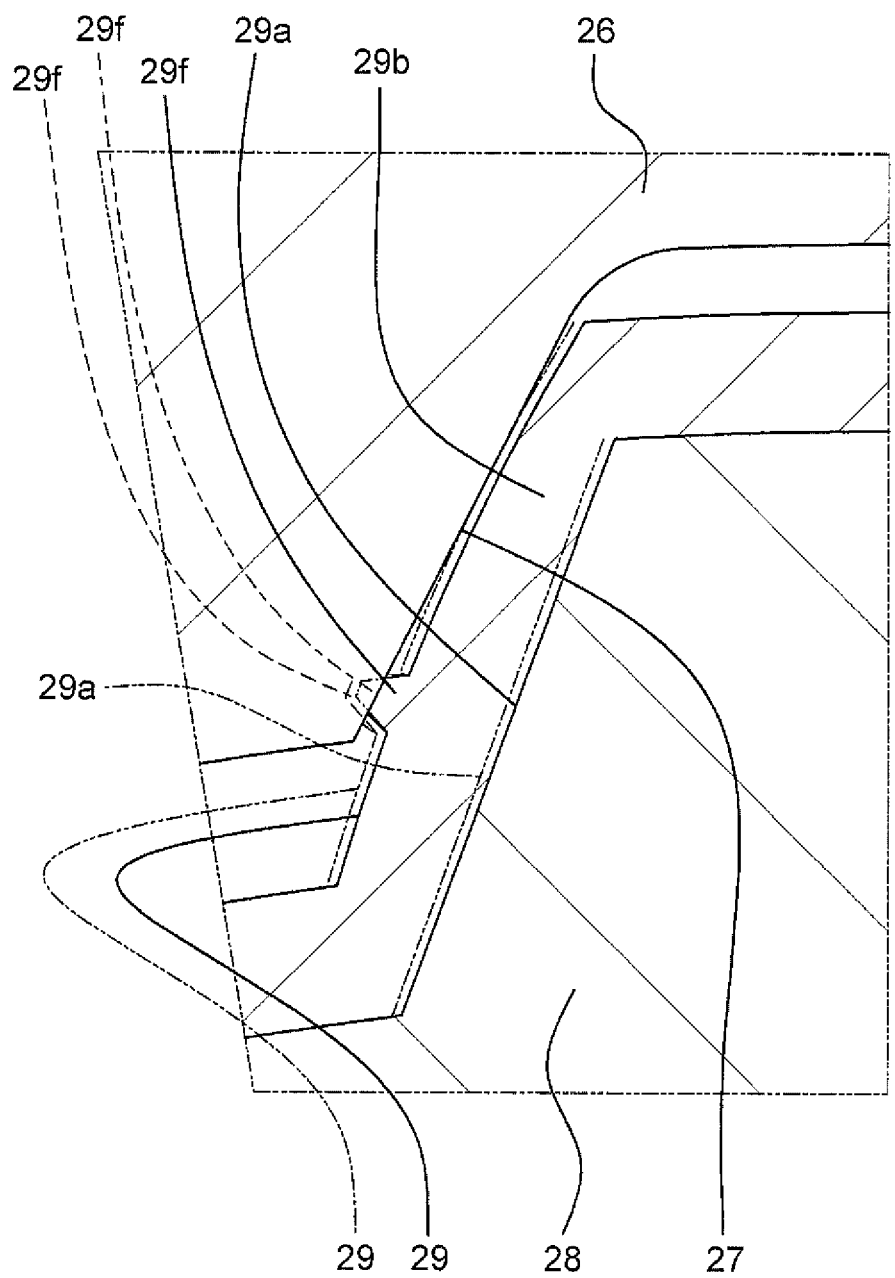
FIG. 13 is a partially enlarged view of FIG. 10 illustrating, as a state diagram, an amount of elastic deformation of the protrusion during the relative rotation.

FIG. 10 is a partially enlarged sectional view corresponding to FIG. 3, and illustrating, as a state diagram, the amount of relative rotation between the outer shaft and the inner shaft. FIG. 11 is a partially enlarged view of FIG. 10 illustrating, as a state diagram, the amount of elastic deformation of the protrusion before the relative rotation. FIG. 12 is a partially enlarged view of FIG. 10 illustrating, as a state diagram, the amount of elastic deformation of the protrusion after the relative rotation. FIG. 13 is a partially enlarged view of FIG. 10 illustrating, as a state diagram, the amount of elastic deformation of the protrusion during the relative rotation.

A protrusion 29f having a trapezoidal sectional shape is formed on each of the right and left tooth flanks of each external tooth 29. The protrusion 29f is projected to such a position as to contact the corresponding tooth flank of the internal tooth 27, and extends in parallel with the axis of the inner shaft 28. Each protrusion 29f is formed at a position that is in an intermediate region in the tooth depth direction of the external tooth 29 and that is close to the tooth tip of the internal tooth 27. It is not necessary to form the protrusions 29f on all the external teeth 29. In the embodiment described above, no protrusions 29f are formed on the external teeth 29 that are adjacent to the external tooth 29 on which the protrusions 29f are formed.

Each of the protrusions 29f has a trapezoidal sectional shape having a high height as indicated by a dashed line shown in FIG. 11, before the inner shaft 28 is spline-fitted to the outer shaft 26. The protrusion 29f has a trapezoidal sectional shape that is bulged like a barrel and that has a lower height and a wider crest, as indicated by a continuous line shown in FIG. 11, after the inner shaft 28 is spline-fitted to the outer shaft 26. In this state, if the outer shaft 26 is removed from the inner shaft 28, the protrusion 29f substantially restores its original trapezoidal shape having a high height, as indicated by the dashed line.

After the inner shaft 28 is spline-fitted to the outer shaft 26, the external teeth 29 of the inner shaft 28 are rotated clockwise and counterclockwise relative to the internal teeth 27 of the outer shaft 26 until the protrusions 29f reach positions indicated by two-dot chain lines shown in FIG. 10 and FIG. 13. The trapezoidal shape having a high height indicated by the dashed line shown in FIG. 13, is shifted to a position indicated by a dotted line due to the relative rotation. The protrusions 29f are compressed more greatly because the protrusions 29f are compressed due to not only the spline-fitting but also the relative rotation. As a result, if the outer shaft 26 is removed from the inner shaft 28 that has been spline-fitted to the outer shaft 26 as shown in FIG. 12, each protrusion 29f is brought into a trapezoidal sectional shape having a low height and a wide crest as indicated by the dashed line shown in FIG. 12. That is, each protrusion 29f is plastically deformed into the trapezoidal sectional shape having a low height and a wide crest as indicated by the dashed line shown in FIG. 12, from the trapezoidal sectional shape having a high height as indicated by the dashed line shown in FIG. 11.

When the protrusion 29f is in the state indicated by the dashed line shown in FIG. 12, if the inner shaft 28 is spline-fitted to the outer shaft 26, the sectional shape of the protrusion 29f is brought into a trapezoidal shape that is bulged like a barrel and that has a lower height and a wider crest as indicated by the continuous line shown in FIG. 12. Because the elastic force of the protrusion 29f having a small elastic deformation amount and having a large elastic modulus as shown in FIG. 12, is smaller than the elastic force of the protrusion 29f having a large elastic deformation amount and having a small elastic modulus as shown in FIG. 11, the outer shaft 26 is smoothly slid with a small sliding resistance, relative to the inner shaft 28. Because the method of forming the splines of the inner shaft 28 in the fourth embodiment is the same as that in the first embodiment, the description thereof is omitted.

Next, the works for assembling the steering tube will be described. The inner shaft 28 is spline-fitted to the outer shaft 26. The protrusion 29f is elastically deformed from the trapezoidal shape having a high height as indicated by the dashed line shown in FIG. 11, into the trapezoidal shape that has a lower height and a wider crest and that is bulged like a barrel, as indicated by the continuous line shown in FIG. 11. Next, the external teeth 29 of the inner shaft 28 are rotated clockwise and counterclockwise relative to the internal teeth 27 of the outer shaft 26 until the protrusions 29f reach the positions indicated by two-dot chain lines shown in FIG. 10 and FIG. 13. The protrusion 29f is plastically deformed from the trapezoidal shape having a high height indicated by the dashed line shown in FIG. 13, into the trapezoidal shape having a low height and a wide crest indicated by the dashed line in FIG. 12. Due to the spline-fitting, each protrusion 29f is elastically deformed from the trapezoidal shape having a low height and a wide crest as indicated by the dashed line in FIG. 12, into the trapezoidal shape having a lower height and a wider crest and bulged like a barrel as indicated by the continuous line shown in FIG. 12.

The elastic deformation amount of the protrusion 29f shown in FIG. 12 after the plastic deformation is smaller than the elastic deformation amount of the protrusion 29f shown in FIG. 11 before the plastic deformation. Therefore, the elastic force of the protrusion 29f shown in FIG. 12 after the plastic deformation is smaller than the elastic force of the protrusion 29f shown in FIG. 11 before the plastic deformation. As a result, by the protrusions 29f after the plastic deformation, the rotation of the outer shaft 26 is smoothly transmitted to the inner shaft 28 with no radial backlash. Thus, the outer shaft 26 is allowed to slide relative to the inner shaft 28 even under low load.

Even if there are variations in elastic deformation amount among a plurality of the protrusions 29f shown in FIG. 11 before plastic deformation due to the variations such as pitch variations and tooth profile variations among a plurality of the external teeth 29, it is possible to reduce the variations in the elastic deformation amount among the protrusions 29f in FIG. 12 after the plastic deformation.

The bearing 22 is secured to the outer tube 21 by fitting the bearing 22 to the outer tube 21 and clinching part of the outer tube 21. The bearing 24 is secured to the inner tube 23 by fitting the bearing 24 to the inner tube 23 and clinching part of the inner tube 23. The bearing 22 is fitted to the steering shaft 25, and the snap ring is fitted to the steering shaft 25 to prevent the bearing 22 from being removed from the steering shaft 25. The bearing 24 is fitted to the steering shaft 25, and the snap ring is fitted to the steering shaft 25 to prevent the bearing 24 from being removed from the steering shaft 25. Thus, the steering shaft 25 is rotatably assembled within the steering tube 20.

Next, the movement of the outer tube 21 and the outer shaft 26 in the axial direction will be described. The outer tube 21 is moved relative to the inner tube 23 in the longitudinal direction, and, at the same time, the outer shaft 26 is moved relative to the inner shaft 28 in the longitudinal direction.

Because the protrusions 29f of the external teeth 29 of the inner shaft 28 come into soft contact with the tooth flanks of the internal teeth 27 of the outer shaft 26 and the elastic force of the protrusions 29f is reduced by the plastic deformation, the outer shaft 26 is smoothly slid relative to the inner shaft 28 under low load. Because the protrusions 29f extend over a predetermined length so as to be in parallel with the axis of the inner shaft 28, it is possible to restrain the outer shaft 26 from being tilted with respect to the inner shaft 28. Therefore, the inner shaft 28 and the outer shaft 26 are easily assembled together.

Next, the operation for rotating the steering wheel will be described. When the steering wheel is rotated, the rotation of the steering wheel is transmitted to the intermediate shaft via the outer shaft 26 and the inner shaft 28. Because the protrusions 29f of the external teeth 29 of the inner shaft 28 come into contact with the tooth flanks of the internal teeth 27 of the outer shaft 26, the protrusions 29f extend over a predetermined length so as to be in parallel with the axis of the inner shaft 28, the protrusions 29f have an elastic force large enough to transmit torque, and the elastic force of the protrusions 29f is reduced by the plastic deformation, the rotation of the outer shaft 26 is smoothly transmitted by the inner shaft 28.

The invention is not limited to the above-described embodiments, and may be implemented in various other embodiments within the scope of the invention.

Figure 9:
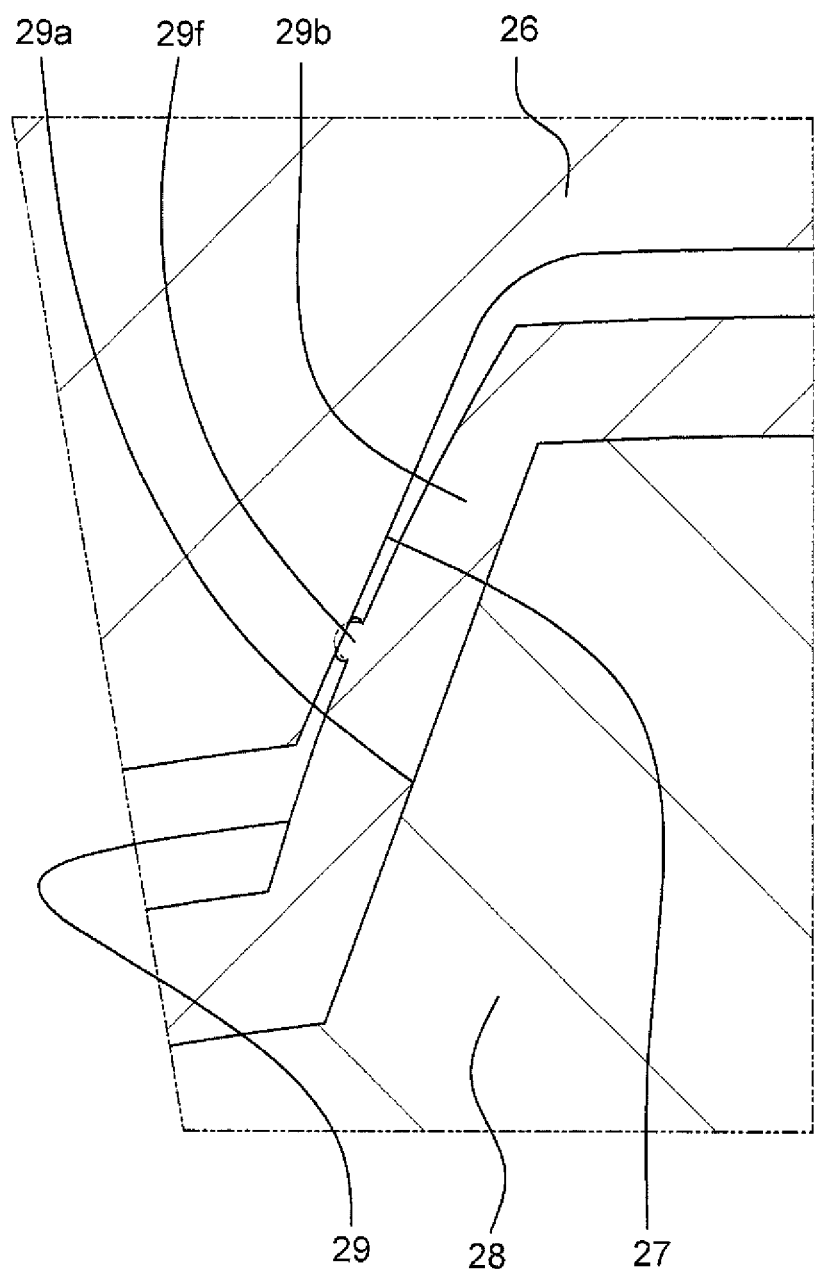
FIG. 9 is a partially enlarged sectional view illustrating a state in which a protrusion in a third embodiment of the invention is compressed.

In the first embodiment, each protrusion 29c is projected to such a position as to contact the corresponding tooth flank of the internal tooth 27 as shown in FIG. 3. In a third embodiment, each protrusion 29f may be projected to such a position that the protrusion 29f is pressed against the corresponding tooth flank of the internal tooth 27, as shown in FIG. 9. FIG. 9 shows a state in which the inner shaft 28 is in a neutral state with respect to the outer shaft 26. The protrusion 29f before compression is indicated by a two-dot chain line, and the protrusion 29f after the compression is indicated by a continuous line. The protrusion 29f that is compressed in the neutral state has the elasticity with which the protrusion 29f can be further compressed. Because the protrusions 29f are compressed between the tooth flanks of the internal teeth 27 and the tooth flanks of the external teeth 29, it is possible to eliminate a backlash between the outer shaft 26 and the inner shaft 28.

In the first embodiment and the second embodiment described above, the protrusions 29c that come into contact with the tooth flanks of the internal teeth 27 of the outer shaft 26 are formed on the tooth flanks of the external teeth 29 of the inner shaft 28. In another embodiment, protrusions that come into contact with the tooth flanks of the external teeth 29 of the inner shaft 28 may be formed on the tooth flanks of the internal teeth 27 of the outer shaft 26.

In the above-described first embodiment, the protrusions 29c each having a semicircular sectional shape are formed on the right and left tooth flanks of each of the external teeth 29. In another embodiment, protrusions 29c each having a sectional shape in which opposite sides of a circular arc are connected by a straight line may be formed on the right and left tooth flanks of each of the external teeth 29.

In the first embodiment described above, the protrusions 29c each having a semicircular sectional shape are formed on the right and left tooth flanks of each external tooth 29. In another embodiment, the protrusion 29c having a semicircular sectional shape may be formed on the left tooth flank of one of adjacent external teeth 29, and the protrusion 29c having a semicircular sectional shape may be formed on the right tooth flank of the other one of the adjacent external teeth 29.

In the first embodiment described above, the protrusions 29c are formed on six external teeth 29 among the eighteen external teeth 29. However, the invention should not be limited to this, and the total number of the external teeth 29 and the number of the external teeth 29 on which the protrusions 29c are formed may be set as appropriate.

What is claimed is:

1. A rotation transmitting apparatus including a first rotary shaft on which multiple external teeth projected radially outward and extending in an axial direction are formed so as to be arranged in a circumferential direction, and a second rotary shaft in which multiple internal teeth projected radially inward and extending in the axial direction are formed so as to be arranged in the circumferential direction, the second rotary shaft being fitted to the first rotary shaft so as to be slidable relative to the first rotary shaft in the axial direction and so as to be engageable with the first rotary shaft in a rotational direction through the use of the external teeth and the internal teeth, wherein the external teeth and the internal teeth have tooth flanks that are engaged with each other in the rotational direction;

a protrusion is formed on the tooth flank of the external tooth, the protrusion being projected toward the corresponding tooth flank of the internal tooth and extending in the axial direction; and the protrusion is made of a resin that is more elastically deformable than the tooth flank, wherein an area of contact between the protrusion and the tooth flank of the internal tooth is made smaller than an area of contact between the tooth flank of the external tooth and the tooth flank of the internal tooth to allow the protrusion to be deformed elastically.

2. The rotation transmitting apparatus according to claim 1, wherein the protrusion is used in a state where an amount of elastic compression by the tooth flank of the internal tooth has been deceased by carrying out relative rotation in a normal direction and a reverse direction between the first rotary shaft and the second rotary shaft.

3. A vehicle steering system comprising the rotation transmitting apparatus according to claim 1, wherein:

the first rotary shaft is an inner shaft rotatably coupled to an intermediate shaft which is distributed at the downstream of the inner shaft side; and the second rotary shaft is an outer shaft rotatably coupled to a steering wheel.

4. A vehicle steering system comprising the rotation transmitting apparatus according to claim 1, wherein:

the first rotary shaft is an outer shaft rotatably coupled to a steering wheel; and the second rotary shaft is an inner shaft rotatably coupled to an intermediate shaft which is distributed at the downstream of the inner shaft side.

5. An intermediate shaft provided with the rotation transmitting apparatus according to claim 1, wherein the first rotary shaft is a lower shaft rotatably coupled to a second universal joint on a pinion shaft side; and the second rotary shaft is an upper shaft rotatably coupled to a first universal joint on a steering shaft side.

* * * * *